(12) United States Patent
Barbieri

(10) Patent No.: US 7,269,909 B1
(45) Date of Patent: Sep. 18, 2007

(54) RAFTER LAYOUT TOOL

(76) Inventor: James D Barbieri, 223 Main St., suite 3, New Milford, NJ (US) 07646

( * ) Notice: Subject to any disclaimer, the term of this patent is extended or adjusted under 35 U.S.C. 154(b) by 0 days.

(21) Appl. No.: 11/385,855

(22) Filed: Mar. 21, 2006

(51) Int. Cl.
*B43L 7/12* (2006.01)
*B43L 7/14* (2006.01)

(52) U.S. Cl. .............................. 33/419; 33/423; 33/424

(58) Field of Classification Search ......... 33/416–426, 33/464, 468, 473
See application file for complete search history.

(56) References Cited

U.S. PATENT DOCUMENTS

| | | | | |
|---|---|---|---|---|
| 1,237,721 A * | 8/1917 | Stanley | ......................... | 33/423 |
| 1,346,050 A * | 7/1920 | Nicholson | ..................... | 33/423 |
| 1,346,409 A * | 7/1920 | Lucas | ........................... | 33/473 |
| 2,368,958 A * | 2/1945 | Williams | ..................... | 33/423 |
| 2,423,786 A * | 7/1947 | Morris | ......................... | 33/468 |
| 2,435,529 A * | 2/1948 | Brockley | ..................... | 33/468 |
| 2,504,244 A * | 4/1950 | Barclay | ........................ | 33/419 |
| 3,378,928 A * | 4/1968 | Hawkins | ...................... | 33/416 |
| 4,712,307 A * | 12/1987 | Kish | ............................ | 33/421 |
| 4,736,524 A * | 4/1988 | King | ............................ | 33/418 |
| 5,205,045 A * | 4/1993 | Liu | .............................. | 33/468 |
| 5,461,794 A * | 10/1995 | Juang | .......................... | 33/418 |
| 6,694,633 B1* | 2/2004 | Nyquist | ....................... | 33/417 |

* cited by examiner

*Primary Examiner*—G. Bradley Bennett
(74) *Attorney, Agent, or Firm*—Michael I. Kroll

(57) ABSTRACT

A rafter layout tool for facilitating the layout of ridge cut, bird's mouth, seat cuts, fascia and soffit for the common hip, valley rafter cuts comprising a protractor member, measurement indicator arm and 90 degree arm and move up and down and side to side for different size lumber from 2"×6" to 2"×12" which is pivotally connected to the base of the protractor member, incorporating means for indicating pitch markings on said protractor. Extending linearly along the measurement indicator arm is a bounded slot providing means for slidably up and down and attaching the 90 degree arm ably to slide side to side and up and down for different size lumber.

13 Claims, 13 Drawing Sheets

30 — COMMON RAFTERS PER FOOT RUN        12.04 12.17 12.37 12.65 13. 13.42 13.89 14.42 15. 15.62 16.28 16.97 17.69 18.44 19.21 20. 20.81 21. 20.81 21.63
HIP AND VALLEY RAFTERS PER FOOT RUN 17.00 17.09 17.23 17.44 17.69 18. 18.36 18.76 19.21 19.70 20.22 20.78 21.38 22. 22.65 23.32 24.02 24.7

FIG. 13

RAFTER LAYOUT TOOL

BACKGROUND OF THE INVENTION

1. Field of the Invention

The present invention relates generally to measurement tools and, more specifically, to a rafter layout tool for facilitating the layout of bird's mouth, seat cuts, fascia and soffit cuts and for the common, hip and valley rafters.

The tool is comprised of a protractor member, indicator arm and 90 degree arm with ability of indicator arm to slide up and down for different size lumber from 2"×6" to 2"×12" and 90 degree arm to slide side to side and up and down for different size fascia, soffit and seat cuts.

2. Description of the Prior Art

There are other rafter squares designed for construction. Typical of these is U.S. Pat. No. 6,725,555 issued to Moore on Apr. 27, 2004.

U.S. Pat. No. 6,725,555

Inventor: Darren S. Moore

Issued: Apr. 27, 2004

The present invention 10 discloses a rafter square 18 having a pivotal indicator arm 14 and pivotal indicator guide 16. The pivotal arm 14 and guide 16 are detachable from the rafter square portion 18 by unscrewing the thumbscrew 20 that secures the device to its pivotal point 22 located on the heel portion of the right angle square 18. A wing nut 24 is also removable and when in use allows the indicator arm 14 to slide along a track 26 and point to indication markings 28 along the tracks surface. Also provided are a ring bearing 38 and wing nut retainer 30. Located at the distal end of the indicator guide 16 is a storage port 40 with an end cap 42. The storage port 40 can hold the removed wing nut 24 and thumbscrew 20 when the arm 14 is removed. Within the storage port 14 a guide chart 44 can also be stored and used for reference.

While these squares may be suitable for the purposes for which they were designed, they would not be as suitable for the purposes of the present invention, as hereinafter described.

It is thus desirable to provide a tool to facilitate in scribing cut lines associated with rafter roof framing construction.

It is further desirable to provide a rafter layout tool wherein The tool is comprised of a protractor member, indicator arm and 90 degree arm with ability of indicator arm to slide up and down for different size lumber from 2"×6" to 2"×12" and 90 degree arm to slide side to side and up and down for different size fascia, soffit and seat cuts.

SUMMARY OF THE PRESENT INVENTION

A primary object of the present invention is to provide a tool to facilitate in scribing cut lines associated with roof framing construction.

Another object of the present invention is to provide a rafter layout tool having a protractor member comprising a linear base with a protractor segment depending from both sides common rafters, hip and valley, with common on top and on both sides of 18" indicator arm and lower side of the protractor hip and valley rafters markings.

Yet another object of the present invention is to provide a rafter layout tool with a measurement arm ending at one end and each side to a point to render is pitch marking upon said protractor, with common on top and hip and valley on bottom, which is on both sides of the indicator arm at a square position.

Still yet another object of the present invention is to provide a rafter layout tool with a measurement on indicator arm having a longitudinal slot within its length with measurement marked on both sides.

Another object of the present invention is to provide a rafter layout tool with a 90-degree arm that is slidably and locking anchored at inside slot to the indicator arm guide slot.

Additional objects of the present invention will appear as the description proceeds.

The present invention overcomes the shortcomings of the prior art by providing a rafter layout tool for facilitating the layout of ridge cut, bird's mouth, seat cuts, fascia and soffit for the common hip, valley rafter cuts comprising a protractor member, measurement indicator arm and 90 degree arm and move up and down and side to side for different size lumber from 2"×6" to 2"×12" which is pivotally connected to the base of the protractor member, incorporating means for indicating pitch markings on said protractor. Extending linearly along the measurement indicator arm is a bounded slot providing means for slidably up and down and attaching the 90 degree arm ably to slide side to side and up and down for different size lumber.

The foregoing and other objects and advantages will appear from the description to follow. In the description reference is made to the accompanying drawings, which forms a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawings, like reference characters designate the same or similar parts throughout the several views.

The following detailed description is, therefore, not to be taken in a limiting sense, and the scope of the present invention is best defined by the appended claims.

BRIEF DESCRIPTION OF THE DRAWING FIGURES

In order that the invention may be more fully understood, it will now be described, by way of example, with reference to the accompanying drawing in which:

FIG. 13 is a detailed view of straight edge indicia of the present invention.

DESCRIPTION OF THE REFERENCED NUMERALS

Figure 1:
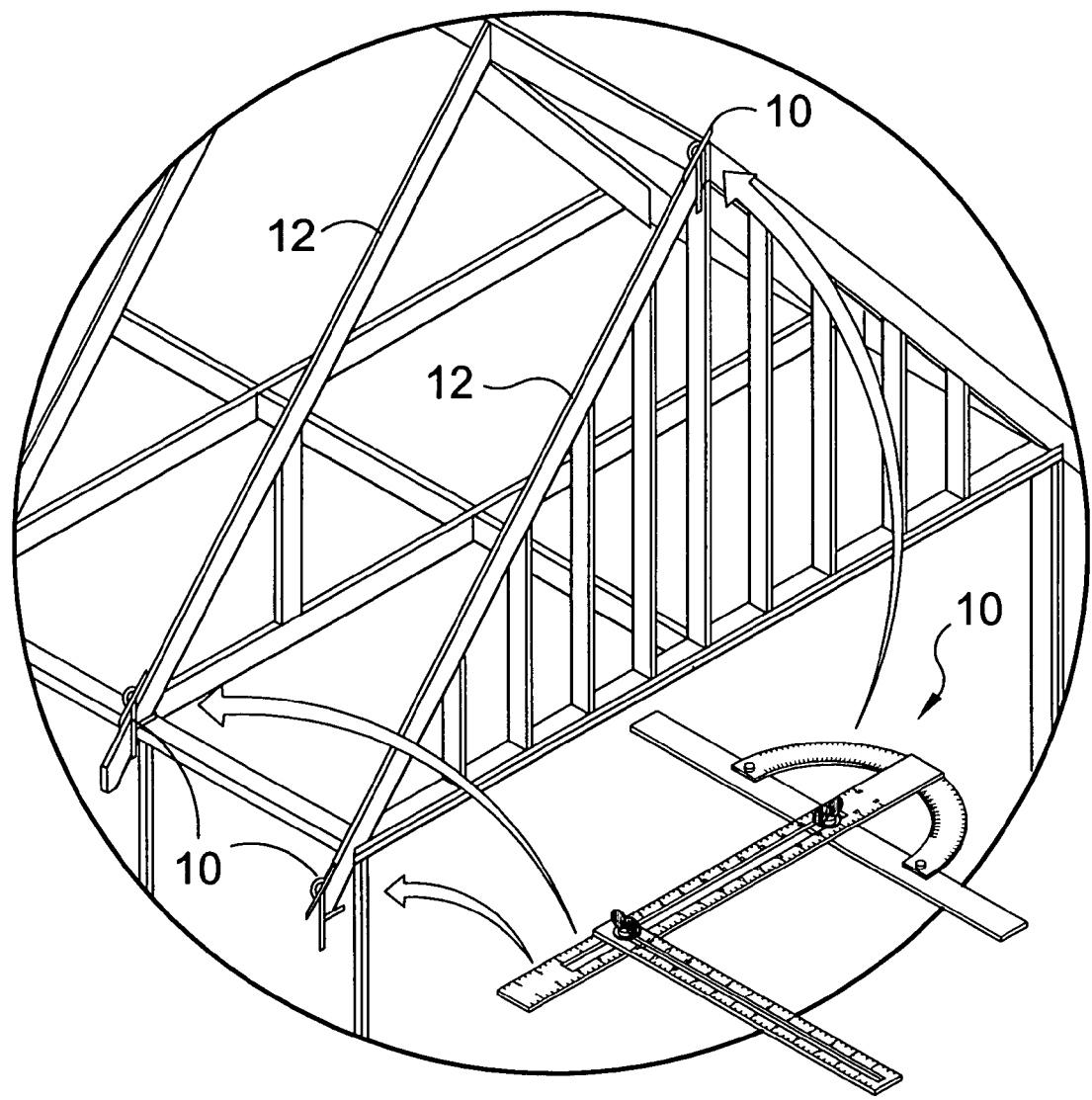
FIG. 1 is an illustrative view of the present invention in use.

Turning now descriptively to the drawings, in which similar reference characters denote similar elements throughout the several views, the figures illustrate the Compound Cut Rafter Square of the present invention of the present invention. With regard to the reference numerals used, the following numbering is used throughout the various drawing figures.

10 Rafter Square of the present invention
12 rafter
13 protractor
14 straight edge
16 pitch indicator guide
18 wing nut
20 pivot and slide point
22 indicator slide arm
24 90-degree arm
26 slide track of 22
28 slide track of 24
30 indicia of straight edge
32 indicia of pitch indicator guide
34 indicia of indicator slide arm
36 indicia of 90-degree slide arm
40 point of reference
42 lumber

DETAILED DESCRIPTION OF THE PREFERRED EMBODIMENT

The following discussion describes in detail one embodiment of the invention (and several variations of that embodiment). This discussion should not be construed, however, as limiting the invention to those particular embodiments, practitioners skilled in the art will recognize numerous other embodiments as well. For definition of the complete scope of the invention, the reader is directed to appended claims.

FIG. 1 is an illustrative view of the present invention 10 in use. The present invention is a rafter square 10 for laying out roof rafters 12, calculating and marking out the length of ridge cut, bird cut seat cut, fascia and soffit cut and for pitches for common, hip and valley required cuts of rafters 12 having a pivotal locking indicator arm that rotates about a pitch indication guide which is located on both sides, left and right of being at square position, upper pitches for common rafters and lower pitches for hip and valley rafters. A sliding, pivotal locking indicator arm is 1" to 18" on right and left side with measurements and rides up and down for different size material from 2"×6" to 2"×12" lumber. Within the indicator arm is a 90-degree arm that slides left to right and rides up and down allowing the seat cut and soffit cut having different size measurements. On this arm is measurements 1" to 12" on top and bottom. The device of the present invention is for left and right handed people.

Figure 2:
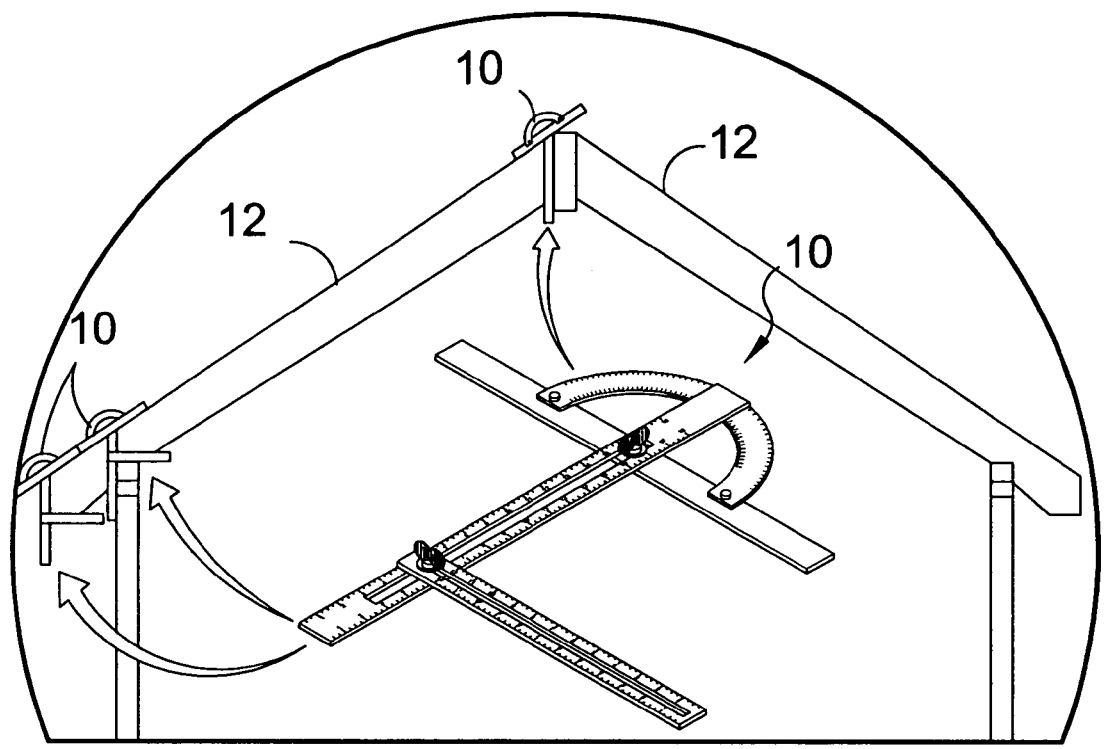
FIG. 2 is an orthographic view of the present invention in use.

FIG. 2 is an orthographic view of the present invention 10 in use. The present invention 10 is a rafter square 10 for laying out roof rafters 12, calculating and marking out the length of ridge cut, bird cut seat cut, fascia and soffit cut and for pitches for common, hip and valley required cuts of rafters 12 having a pivotal locking indicator arm that rotates about a pitch indication guide which is located on both sides, left and right of being at square position, upper pitches for common rafters 10 and lower pitches for hip and valley rafters 10. A sliding, pivotal locking indicator arm is 1" to 18" on right and left side with measurements and rides up and down for different size material from 2"×6" to 2"×12" lumber. Within the indicator arm is a 90 degree arm that slides left to right and rides up and down allowing the seat cut and soffit cut having different size measurements. On this arm is measurements 1" to 12" on top and bottom. The device of the present invention 10 is for left and right handed people.

Figure 3:
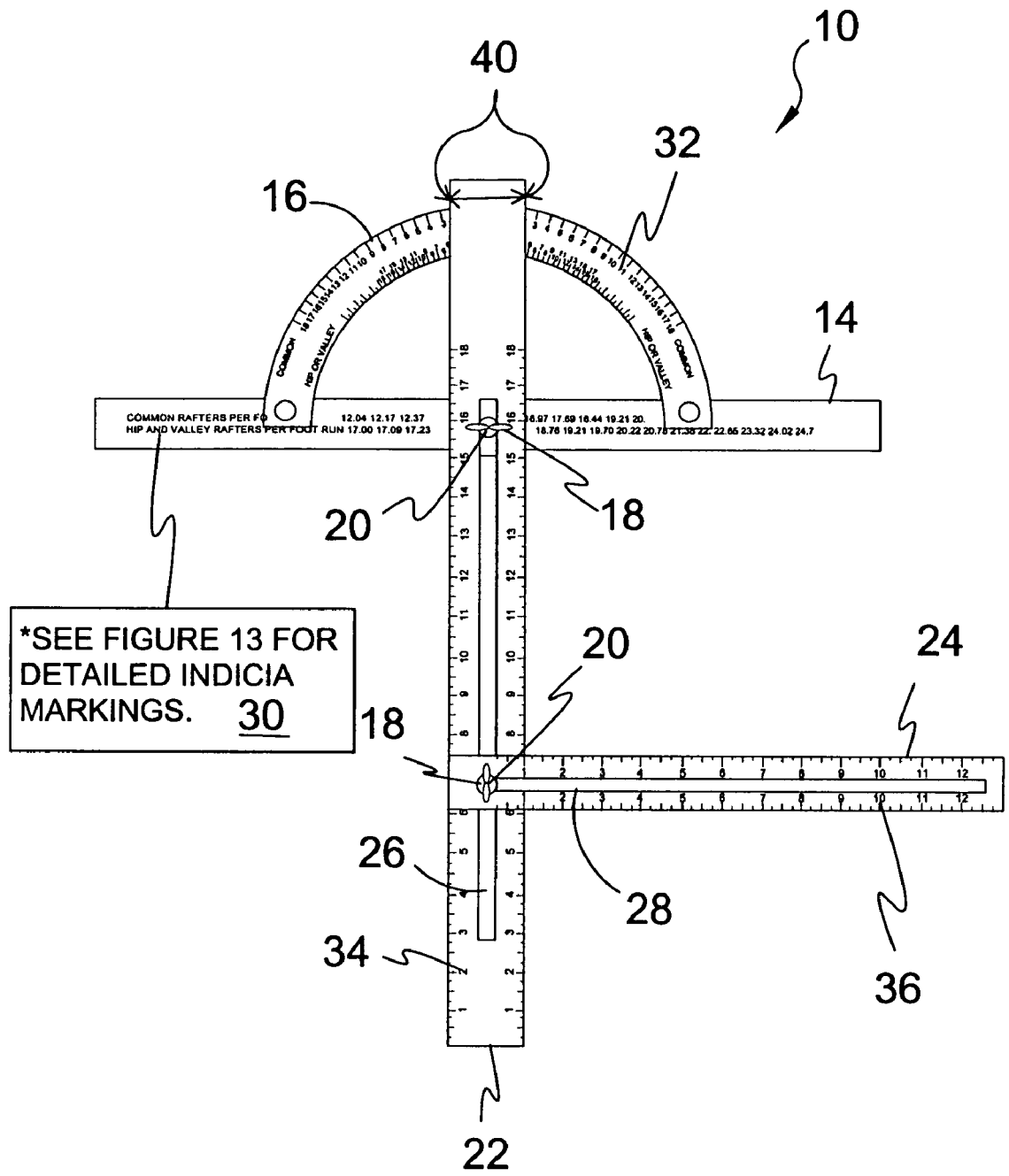
FIG. 3 is a top view of the present invention.

FIG. 3 is a top view of the present invention 10. The present invention 10 is a rafter square for laying out roof rafters, calculating and marking out the length of ridge cut, bird cut seat cut, fascia and soffit cut and for pitches for common, hip and valley required cuts of rafters having a pivotal locking indicator slide arm 22 that rotates about a pivot and slide point 20 centrally disposed on a straight edge 14 subjacent to a semi-circular pitch indication guide 16 which is located on both sides, left and right of being at square position, upper pitches for common rafters and lower pitches for hip and valley rafters. The sliding, pivotal locking indicator arm 22 is 1" to 18" on right and left side with measurements and has a slide track 26 that rides up and down and rotates along the pivot and slide point 20 and is secured in the desired position by a wing nut 18 for different size material from 2"×6" to 2"×12" lumber. The elongate edges of the indicator slide arm 14 serve as points of reference 40 relative to the indicia 32 on the pitch indicator guide 16. Within the indicator arm 22 is a 90 degree arm 28 that slides left to right along its own slide track 28 which intersects with the slide track 26 of the indicator arm 22 and rides up and down therein allowing the seat cut and soffit cut having different size measurements. Indicia 36 are disposed on both sides of the 90 degree arm in measurements 1" to 12". Indicia 30,32,34 is also provided as indication markers on the straight edge 14, the pitch indicator guide 16 and the indicator slide arm 34. The pivot and slide points 20 are secured in the desired positions by wing nuts 18.

Figure 4:
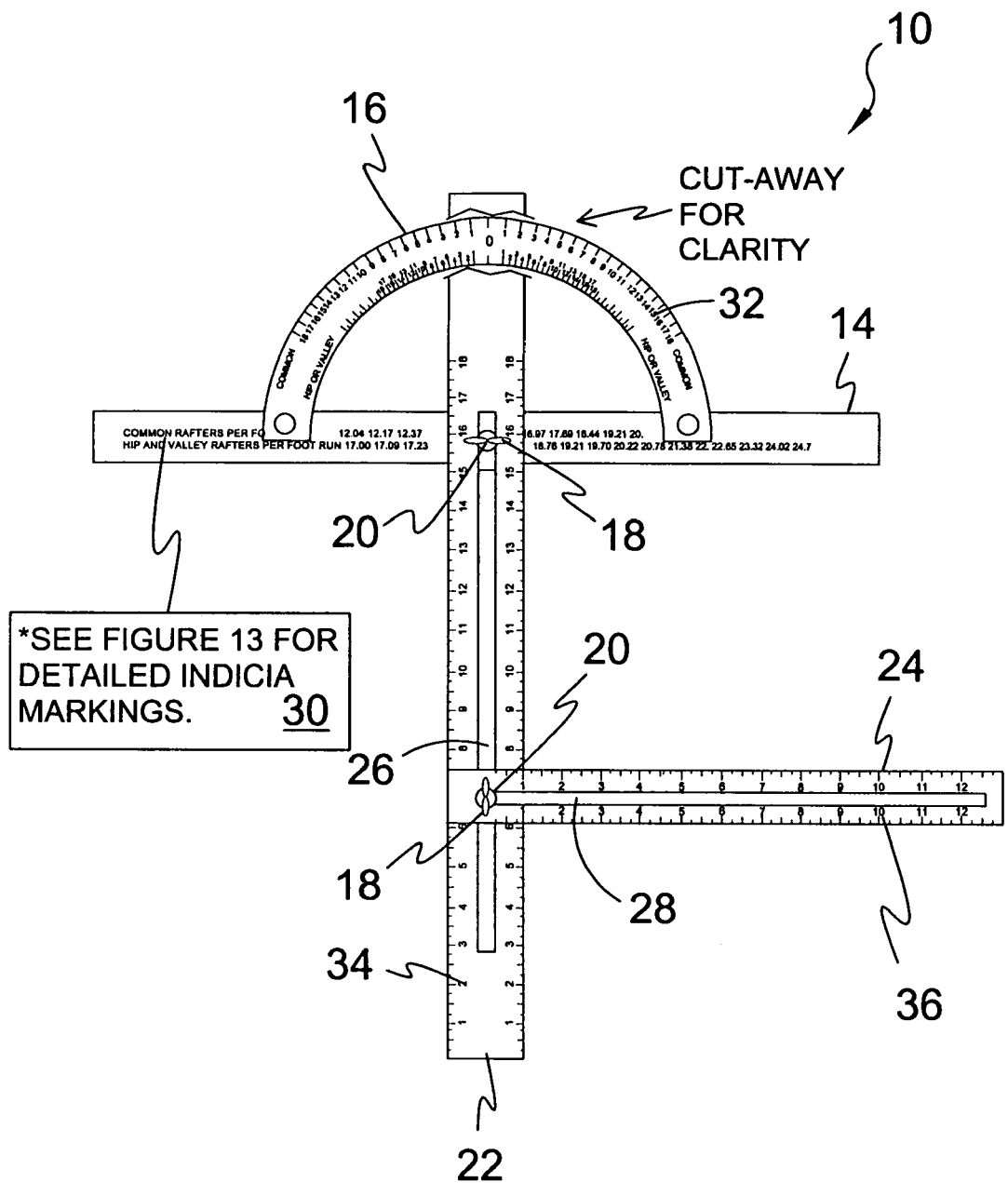
FIG. 4 is a front view and cut away of the present invention.

FIG. 4 is a front view and cut away of the present invention 10. The present invention 10 is a rafter square for laying out roof rafters, calculating and marking out the length of ridge cut, bird cut seat cut, fascia and soffit cut and for pitches for common, hip and valley required cuts of rafters having a pivotal locking indicator slide arm 22 that rotates about a pivot and slide point 20 centrally disposed on a straight edge 14 subjacent to a semi-circular pitch indication guide 16 which is located on both sides, left and right of being at square position, upper pitches for common rafters and lower pitches for hip and valley rafters. The sliding, pivotal locking indicator arm 22 is 1" to 18" on right and left side with measurements and has a slide track 26 that rides up and down and rotates along the pivot and slide point 20 and is secured in the desired position by a wing nut 18 for different size material from 2"×6" to 2"×12" lumber. The elongate edges of the indicator slide arm 14 serve as points of reference relative to the indicia 32 on the pitch indicator guide 16. Within the indicator arm 22 is a 90 degree arm 28 that slides left to right along its own slide track 28 which intersects with the slide track 26 of the indicator arm 22 and rides up and down therein allowing the seat cut and soffit cut having different size measurements. Indicia 36 are disposed on both sides of the 90 degree arm in measurements 1" to 12". Indicia 30,32,34 is also provided as indication markers on the straight edge 14, the pitch indicator guide 16 and the indicator slide arm 34. The pivot and slide points 20 are secured in the desired positions by wing nuts 18. Within the indicator arm 14 is a 90-degree arm 24 that slides left to right and rides up and down allowing the seat cut and soffit cut having different size measurements. On this arm is measurements 1" to 12" on top and bottom.

Figure 5:
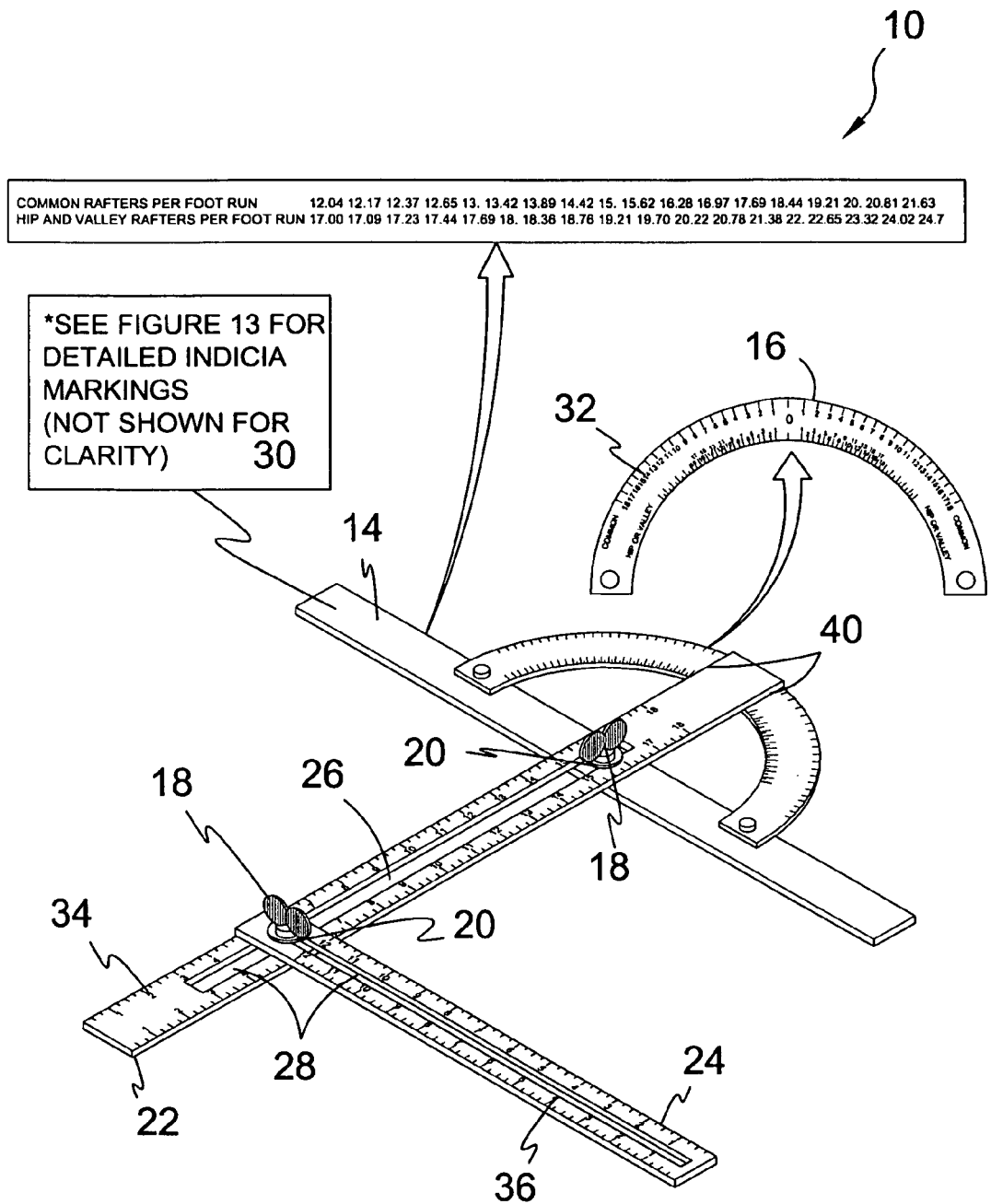
FIG. 5 is a perspective view of the present invention.

FIG. 5 is a perspective view of the present invention 10. The present invention 10 is a rafter square for laying out roof rafters, calculating and marking out the length of ridge cut, bird cut seat cut, fascia and soffit cut and for pitches for common, hip and valley required cuts of rafters having a pivotal locking indicator slide arm 22 that rotates about a pivot and slide point 20 centrally disposed on a straight edge 14 subjacent to a semi-circular pitch indication guide 16 which is located on both sides, left and right of being at square position, upper pitches for common rafters and lower pitches for hip and valley rafters. The sliding, pivotal locking indicator arm 22 is 1" to 18" on right and left side with measurements and has a slide track 26 that rides up and down and rotates along the pivot and slide point 20 and is secured in the desired position by a wing nut 18 for different size material from 2"×6" to 2"×12" lumber. The elongate edges of the indicator slide arm 14 serve as points of reference 40 relative to the indicia 32 on the pitch indicator guide 16. Within the indicator arm 22 is a 90 degree arm 28 that slides left to right along its own slide track 28 which intersects with the slide track 26 of the indicator arm 22 and rides up and down therein allowing the seat cut and soffit cut having different size measurements. Indicia 36 are disposed on both sides of the 90 degree arm in measurements 1" to 12". Indicia 30,32,34 is also provided as indication markers on the straight edge 14, the pitch indicator guide 16 and the indicator slide arm 34. The pivot and slide points 20 are secured in the desired positions by wing nuts 18. Within the indicator arm 14 is a 90-degree arm 24 that slides left to right and rides up and down allowing the seat cut and soffit cut having different size measurements.

Figure 6:
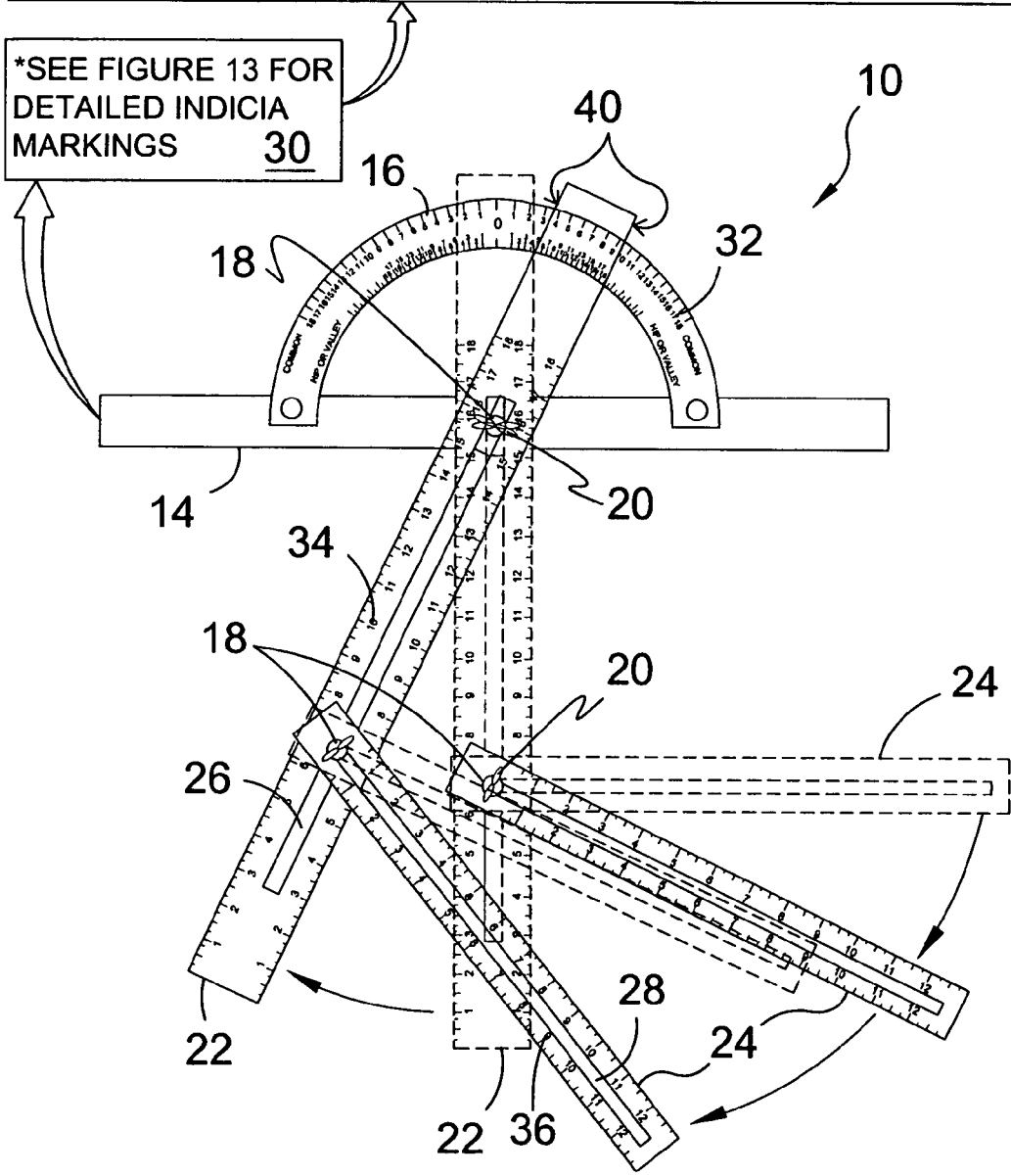
FIG. 6 is a top view of the present invention.

FIG. 6 is a top view of the present invention. The tool is also designed for bird mouth cuts, ridge cuts, and other type cuts required in the building industry. Shown are the indicator slide arm 22 and 90 degree arm 24 sliding and pivoting along pivot and slide points 20 disposed within their respective slide tracks 26,28. Indicia 30,32,34,36 disposed on the straight edge 14, the pitch indicator guide 16, indicator slide arm 22 and the 90 degree arm provide indicator markings for user reference. Wing nuts 18 serve to keep the arms at the desired angles as needed. The edges of the indicator slide arm 22 serve as points of reference 40 relative to the indicia 32 disposed on the pitch indicator guide 16.

Figure 7:
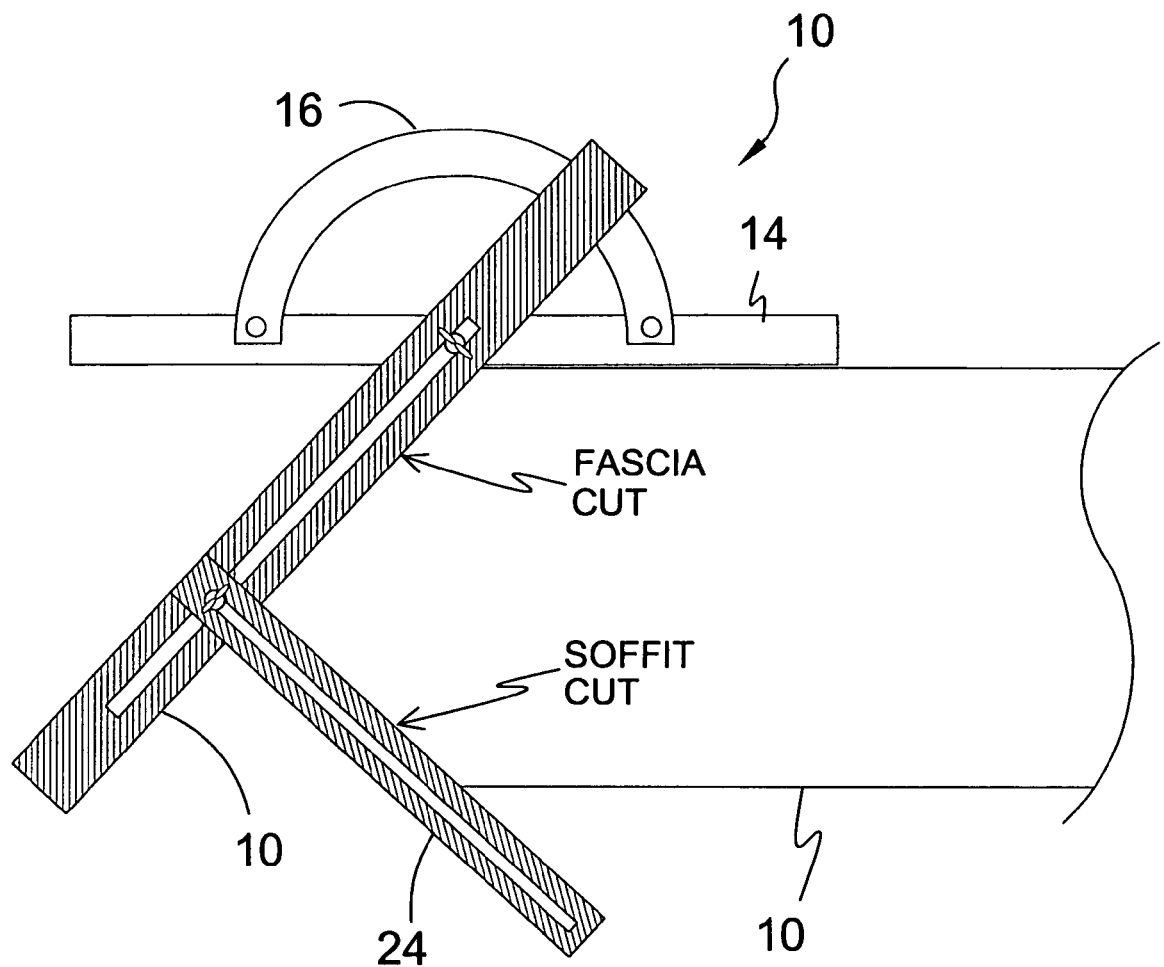
FIG. 7 is a frontal view of the present invention showing soffit and fascia cuts.

FIG. 7 is a frontal view of the present invention 10 showing soffit and fascia cuts being marked off on a piece of lumber 42. The rafter square 10 is comprised of a protractor member 14,16, measurement arm 22 and right angle arm 24. The measure arm 24 is pivotally connected to the base arm 14 of the protractor and incorporates means for indicating angular measurement.

Figure 8:
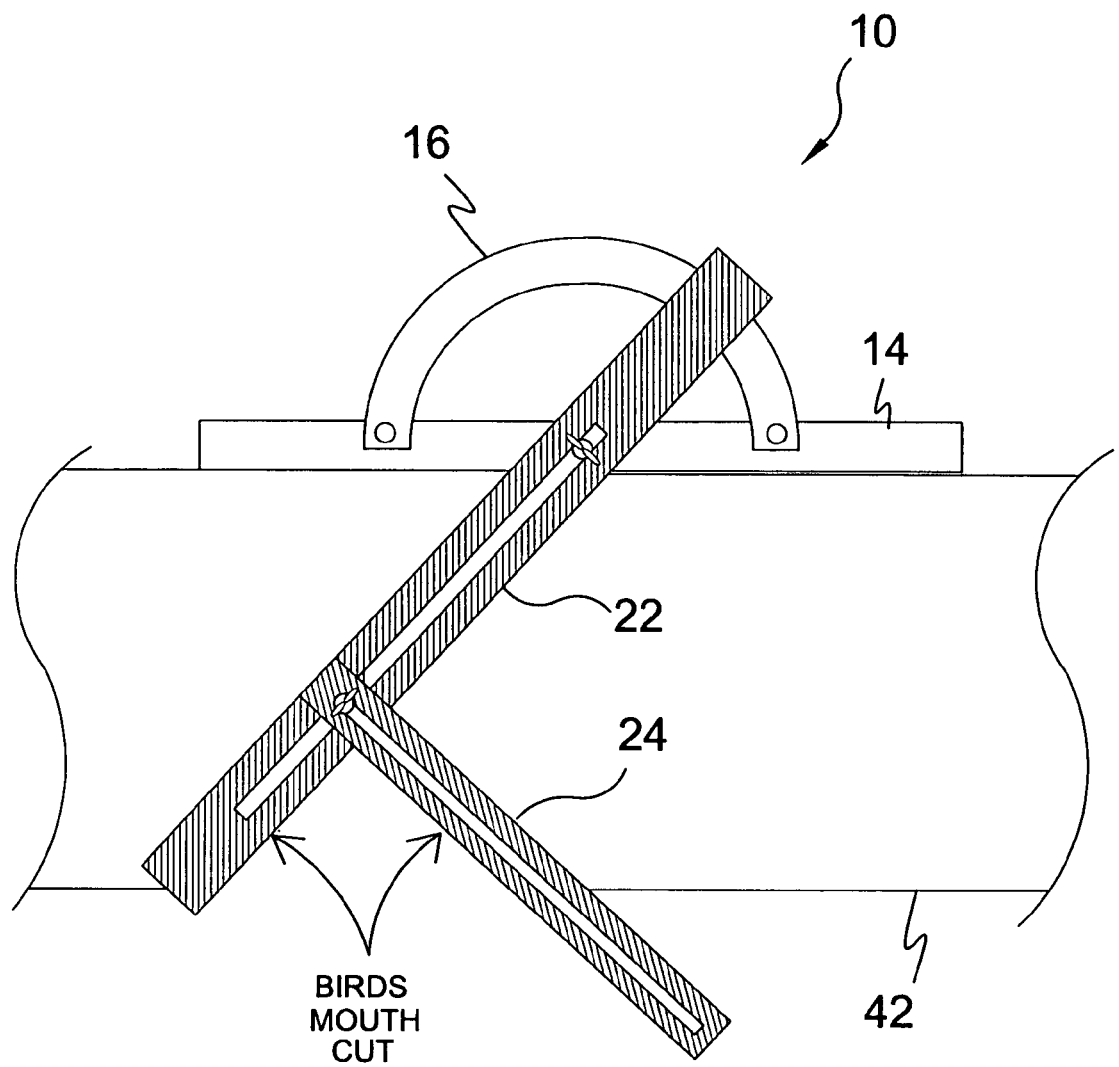
FIG. 8 is a frontal view of the present invention showing bird mouth cuts.

FIG. 8 is a frontal view of the present invention 10 showing bird mouth cuts being marked off on a piece of lumber 42. The rafter square 10 is comprised of a protractor member 14,16, measurement arm 22 and right angle arm 24. The measure arm 24 is pivotally connected to the base arm 14 of the protractor and incorporates means for indicating angular measurement.

Figure 9:
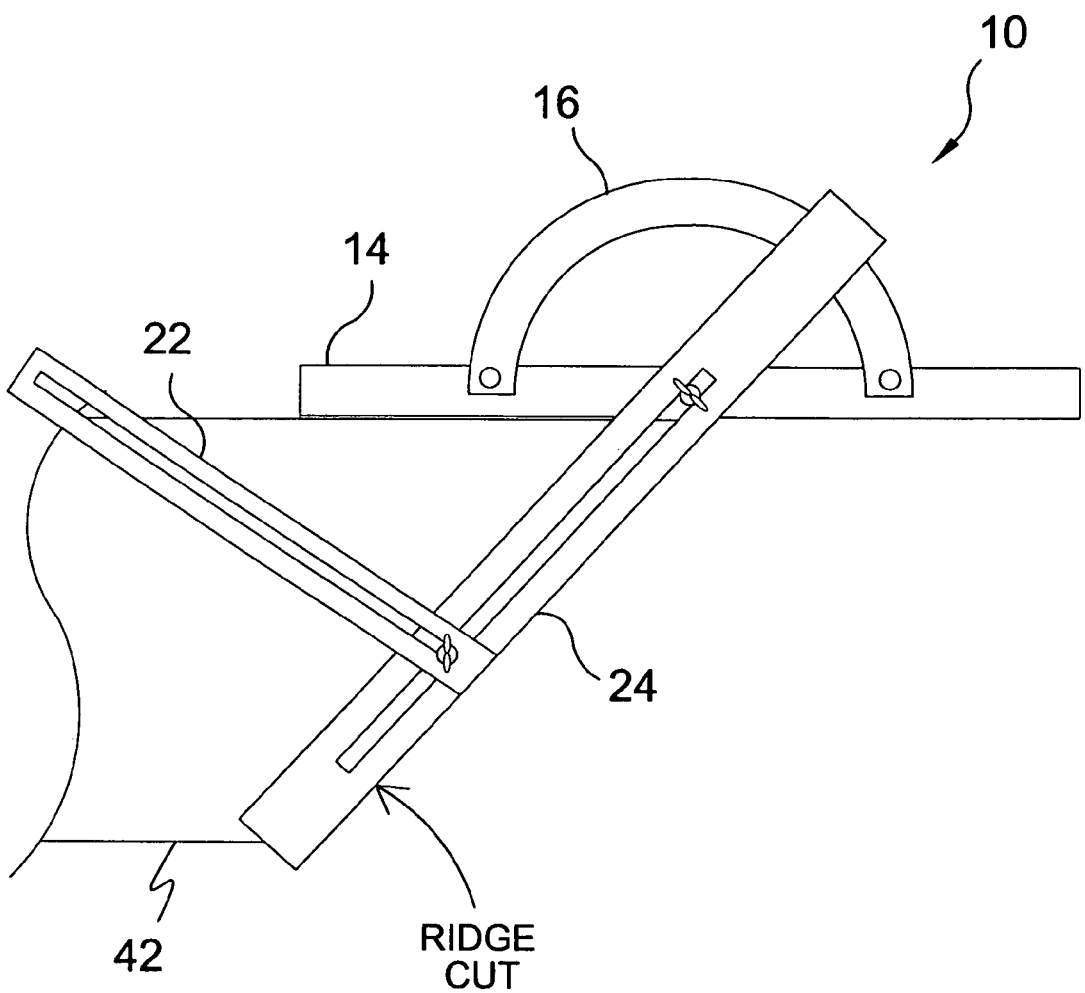
FIG. 9 is a frontal view of the present invention showing ridge cuts.

FIG. 9 is a frontal view of the present invention showing ridge cuts. Shown is a frontal view of the present invention 10 laying out a ridge cut on a piece of lumber 42. The rafter square 10 is comprised of a protractor member 14,16, measurement arm 22 and right angle arm 24. The measure arm 24 is pivotally connected to the base arm 14 of the protractor and incorporates means for indicating angular measurement.

Figure 10:
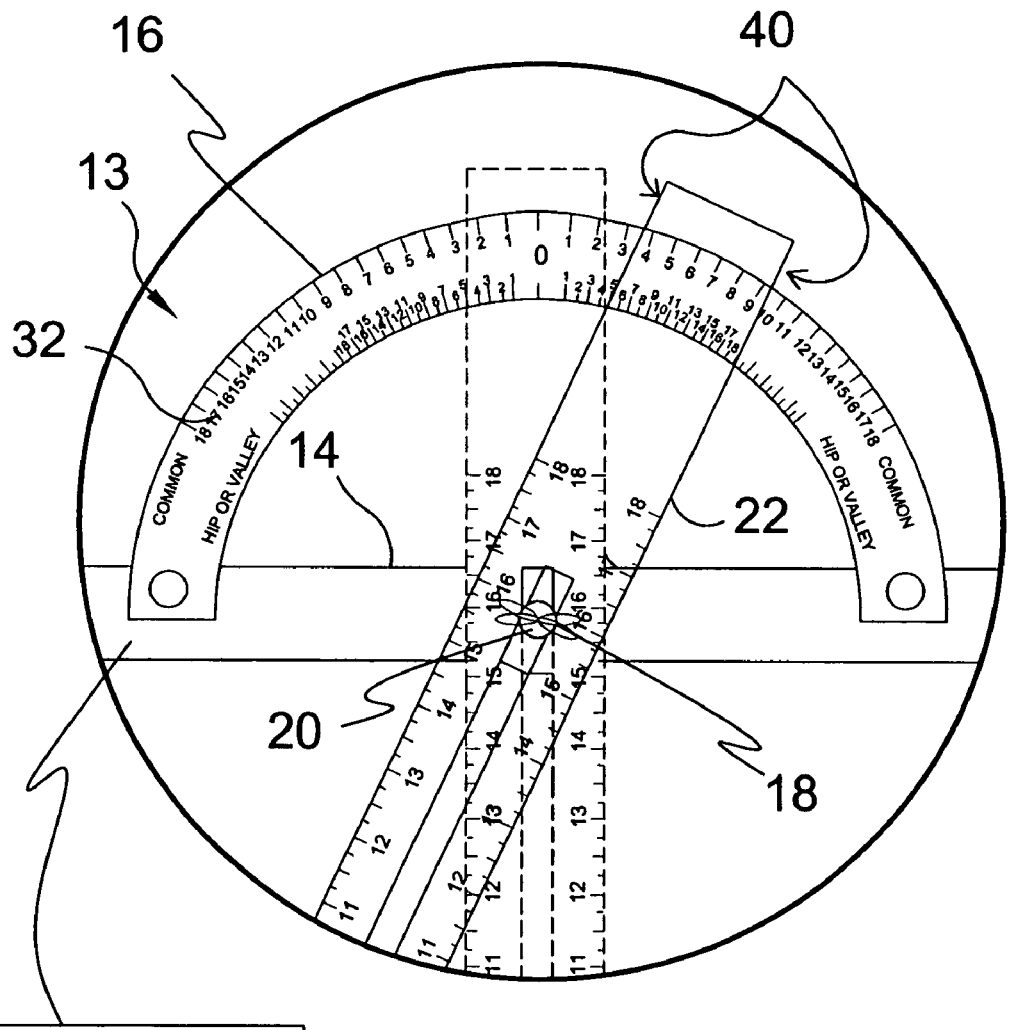
FIG. 10 is a detailed view of the present invention.

FIG. 10 is a detailed view of the protractor 13 and indicator slide arm 22 of the present invention. Shown is the relationship of the indicator slide arm 22 with the components of the protractor 13 which comprises a straight edge 14 and a pitch indicator guide 16, both having indicia 30,32. The edges of the indicator slide arm provide points of reference 40 with regard to the indicia disposed on the pitch indicator guide 16. The indicator slide arm 22 is secured to a the straight edge 14 at the pivot and slide point 20 by means of a wing nut 18.

Figure 11:
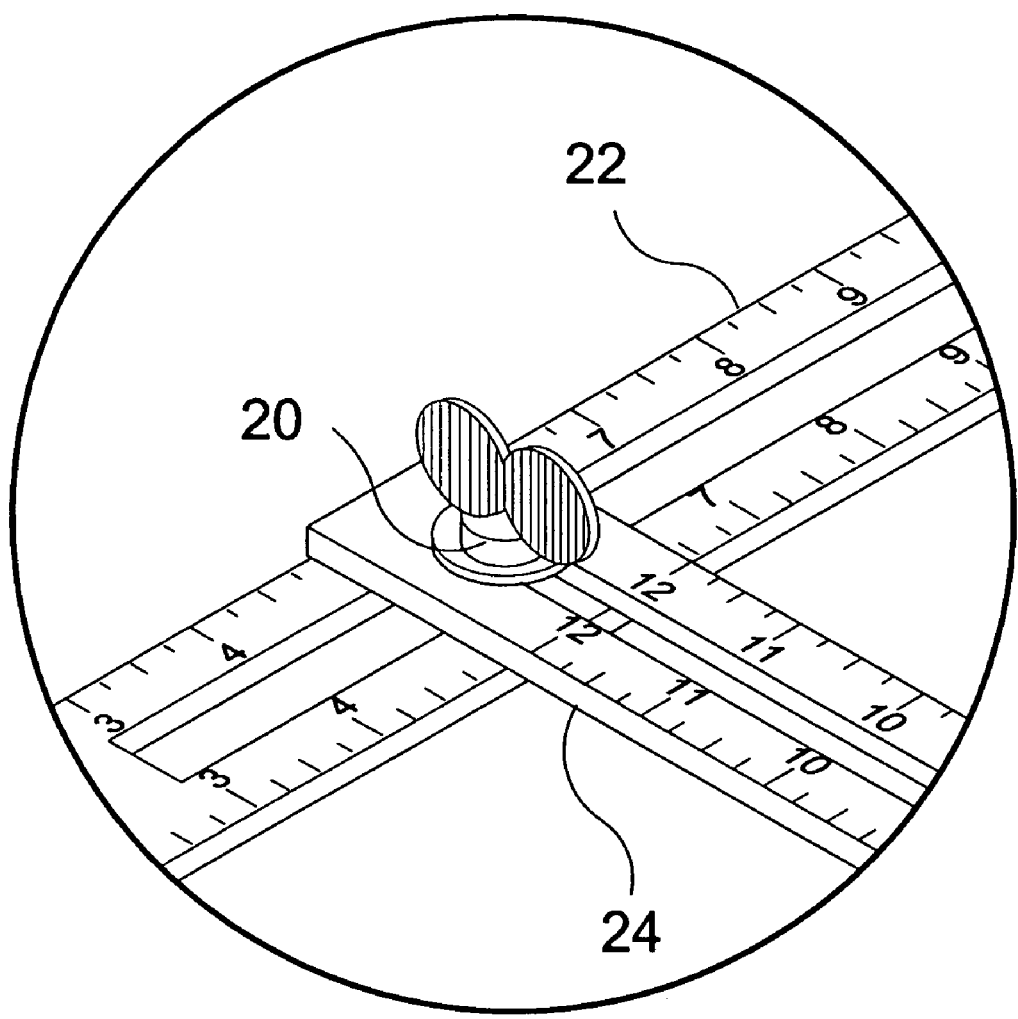
FIG. 11 is a detailed view of the present invention.

FIG. 11 is a detailed view of the pivot and slide point 20 where the indicator slide arm 22 and the 90-degree arm 24 intersect.

Figure 12:
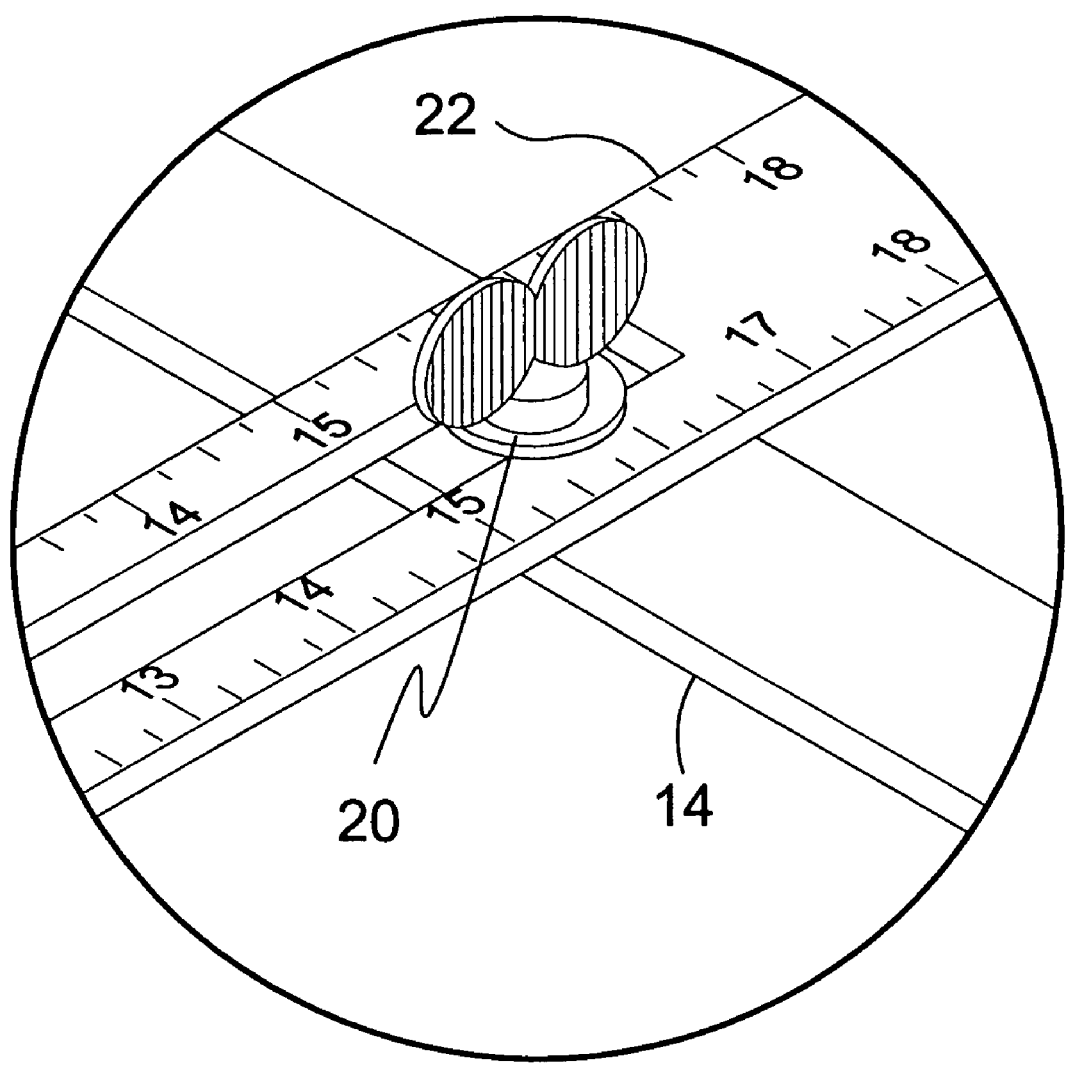
FIG. 12 is a detailed view of the present invention.

FIG. 12 is a detailed view of the pivot and slide point 20 where the indicator slide arm 22 and the straight edge 14 intersect.

FIG. 13 is a detailed view of straight edge indicia 30 of the present invention.

It will be understood that each of the elements described above, or two or more together may also find a useful application in other types of methods differing from the type described above.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims:

1. A rafter square for making compound cuts comprising:
    a) a protractor member comprising a straight edge and associated semi-circular pitch indicator guide, each having indicia disposed thereon;
    b) an elongate indicator slide arm have a recess extending longitudinally through the central portion thereof forming a slide track that is used to engage a center point of said straight edge as a pivot and slide point, said indicator slide arm having indicia extending lengthwise along each edge thereof;
    c) retaining means for releasing and securing said indicator slide arm to said straight edge to allow and prevent the movement thereof accordingly;
    d) an elongate 90-degree arm have a recess extending longitudinally through the central portion thereof forming a slide track that is used to intersect said slide track of said indicator slide arm as a pivot and slide point, said 90-degree arm having indicia extending lengthwise along each edge thereof; and
    e) retaining means for releasing and securing said 90-degree arm to said indicator slide arm to allow and prevent the movement thereof accordingly.

2. A rafter square for making compound cuts as recited in claim 1, wherein said retaining means for said for said pivot and slide points are wing nuts.

3. A rafter square for making compound cuts as recited in claim 2, wherein said indicia on said pitch indicator guide represent the desired pitch of the cut relative to said center point of said straight edge.

4. A rafter square for making compound cuts as recited in claim 3, wherein the edges of said sliding indicator arm define points of reference relative to said indicia on said pitch indicator arm.

5. A rafter square for making compound cuts as recited in claim 4, wherein said wing nut is turned to release said sliding indicator arm so it may slide longitudinally and rotate along said slide and pivot point of said straight edge to the desired position as indicated by a point of reference mating with the appropriate indicia thereon.

6. A rafter square for making compound cuts as recited in claim 5, wherein said indicia disposed on said indicator slide arm are standard units of measurement.

7. A rafter square for making compound cuts as recited in claim 6, wherein said standard of measurement is inches.

8. A rafter square for making compound cuts as recited in claim 7, wherein said indicia on said indicator slide arm denote 1-18 inches along each edge thereof.

9. A rafter square for making compound cuts as recited in claim 8, wherein said wing nut of said pivot and slide point at the intersection of said indicator slide arm and said 90-degree arm is loosened to allow to slide to either side of said indicator slide arm and to rotate along said pivot and slide point and is locked down by said wing nut when the appropriate position has been achieved thereby defining the second cut to be made relative to the first cut as indicated by the position of said indicator slide arm.

10. A rafter square for making compound cuts as recited in claim 9, wherein said indicia disposed on said 90-degree arm denotes standard units of measurement.

11. A rafter square for making compound cuts as recited in claim 10, wherein said standard of measurement is inches.

12. A rafter square for making compound cuts as recited in claim 11, wherein said indicia on said indicator slide arm denote 1-12 inches along each edge thereof.

13. A rafter square for making compound cuts as recited in claim 12, wherein said indicia on said straight edge is a table providing data concerning common, hip and valley rafters per foot run.

\* \* \* \* \*